(12) United States Patent
Takata et al.

(10) Patent No.: US 9,511,727 B2
(45) Date of Patent: Dec. 6, 2016

(54) POWER LINE COMMUNICATION SYSTEM, CONNECTOR DEVICE, AND POWER LINE COMMUNICATION DEVICE

(75) Inventors: Yousuke Takata, Osaka (JP); Takeshi Hagihara, Osaka (JP); Yutaka Komatsu, Osaka (JP); Hiroya Andoh, Toyota (JP); Yuta Ochiai, Toyota (JP); Nobuyuki Nakagawa, Miyoshi (JP); Yukihiro Miyashita, Toyota (JP)

(73) Assignees: Sumitomo Electric Industries, Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 627 days.

(21) Appl. No.: 14/003,136

(22) PCT Filed: Feb. 1, 2012

(86) PCT No.: PCT/JP2012/052267
§ 371 (c)(1),
(2), (4) Date: Sep. 4, 2013

(87) PCT Pub. No.: WO2012/120945
PCT Pub. Date: Sep. 13, 2012

(65) Prior Publication Data
US 2013/0342008 A1    Dec. 26, 2013

(30) Foreign Application Priority Data

Mar. 4, 2011 (JP) .................................. 2011-047933
Nov. 8, 2011 (JP) .................................. 2011-244747

(51) Int. Cl.
*B60L 1/00* (2006.01)
*B60L 3/00* (2006.01)
(Continued)

(52) U.S. Cl.
CPC ............. *B60R 16/023* (2013.01); *H04B 3/548* (2013.01); *H04B 2203/547* (2013.01); *H04B 2203/5483* (2013.01)

(58) Field of Classification Search
USPC ........................................ 307/2, 9.1; 320/104
See application file for complete search history.

(56) References Cited

U.S. PATENT DOCUMENTS 5,545,046 A    8/1996 Masuda et al.
2008/0238573 A1 * 10/2008 Yamazaki ............ H03H 7/0138
                                                          333/177
(Continued)

FOREIGN PATENT DOCUMENTS

CN    101277130 A    10/2008
CN    101678800 A    3/2010
(Continued)

OTHER PUBLICATIONS

Notification of the First Office Action Chinese Patent Applicatin No. 201280011778.1 dated Jul. 1, 2014 with English translation.
(Continued)

*Primary Examiner* — Rexford Barnie
*Assistant Examiner* — Xuan Ly
(74) *Attorney, Agent, or Firm* — McDermott Will & Emery LLP

(57) ABSTRACT

Provided are a power line communication system, a connector device, and a power line communication device that allow downsizing of a device for power line communication in a vehicle that performs power line communication with a feeding device via a charging cable. An electromagnetic induction type signal converter and a filter necessary for power line communication are provided in a connector device 3, and a power line communication section which performs power line communication with the electromag-
(Continued)

netic induction type signal converter is provided in an ECU. A capacitor 16, a signal wire 17, and a capacitor 16 are connected in series between AC lines 11 and 12 extending from a tubular part 32 of the connector device 3. The electromagnetic induction type signal converter is formed by a primary coil obtained by winding the signal wire 17 around a toroidal core 15c fitted on the tubular part 32, and a secondary coil obtained by winding a signal wire 13 connected to the power line communication section around the toroidal core 15c. Cutouts 32a and 32b for housing the signal wires 17 and 13 wound around the toroidal core 15c are formed in the tubular part 32 of the connector device 3.

8 Claims, 7 Drawing Sheets

(51) Int. Cl.
*H02G 3/00* (2006.01)
*B60R 16/023* (2006.01)
*H04B 3/54* (2006.01)

(56) References Cited

U.S. PATENT DOCUMENTS

| | | | |
|---|---|---|---|
| 2010/0138088 A1* | 6/2010 | Ichikawa | B60L 1/003 701/22 |
| 2011/0134976 A1 | 6/2011 | Fossion et al. | |

FOREIGN PATENT DOCUMENTS

| | | |
|---|---|---|
| DE | 4446406 A | 7/1995 |
| EP | 0463341 A1 | 1/1992 |
| EP | 1865623 A1 | 12/2007 |
| EP | 2326026 A1 | 5/2011 |
| JP | 61-136327 A | 6/1986 |
| JP | 07-192826 A | 7/1995 |
| JP | 2008-035665 A | 2/2008 |
| JP | 2008072576 A | 3/2008 |
| JP | 2011-015530 A | 1/2011 |
| JP | 2011-109670 A | 6/2011 |

OTHER PUBLICATIONS

Supplementary European Search Report EP Application No. 12755767.6 dated Jun. 27, 2014.
Japanese Office Action issued in Application No. 2011-244747 dated Aug. 13, 2013.
Cyriacus Bleijs et al; Low-cost charging systems with full communication capability, EVS24 International Battery, Hybrid and Fuel Cell Electric Vehicle Symposium, May 13, 2009, EVS24—Stavanger, Norway, pp. 1-9.(URL: htp://www.cars21.com/assets/link/EVS-24-4660443 EDF.pdf).
Peter Van Den Bossche et al, Trends and Developments Status of IEC Global Electric Vehicle Standards, Journal of Asian Electric Vehicles, Dec. 2010, vol. 8, No. 2, pp. 1409-1414, [online], US, (URL:http://www.elec.eng.osaka-cu.ac.jp/~aevc/1409-1414.pdf).
Jim Francfort, Electric Vehicle Charging Levels and Requirements Overview, Clean Cities Dec. 5, 2010, papges 1-29 (http://www.oregonsae.org/Meeting/EV_CHARGE_REQ_dec-15/2010.pdf).
International Search Report in PCT/JP2012/052267 dated Mar. 19, 2012 with English Translation.

* cited by examiner

POWER LINE COMMUNICATION SYSTEM, CONNECTOR DEVICE, AND POWER LINE COMMUNICATION DEVICE

RELATED APPLICATIONS

This application is the U.S. National Phase under 35 U.S.C. §371 of International Application No. PCT/JP2012/052267, filed on Feb. 1, 2012, which in turn claims the benefit of Japanese Application Nos. 2011-047933, filed on Mar. 4, 2011 and 2011-244747, filed on Nov. 8, 2011, the disclosures of which Applications are incorporated by reference herein.

TECHNICAL FIELD

The present invention relates to a power line communication system in which a vehicle such as an electric vehicle or a plug-in hybrid vehicle and a feeding device are connected to each other with a charging cable, and a power line communication device installed in the vehicle and the feeding device perform power line communication with each other via the charging cable. Further, the present invention relates to a connector device which is installed in a vehicle and to which a charging cable for supplying power from a feeding device is connected, and relates to a power line communication device which is installed in a vehicle and which performs power line communication with the feeding device via the charging cable connected to the connector device.

BACKGROUND ART

In recent years, there are beginning to prevail electric vehicles and hybrid vehicles which include devices such as motors and batteries and which travel by driving the motors, using power accumulated in the batteries. Electric vehicles need to have their batteries to be charged by external feeding devices, and even in the case of hybrid vehicles, there are plug-in hybrid vehicles that allow their batteries to be charged by external feeding devices. In a vehicle whose battery is charged from outside, a plug of a charging cable connected to an external feeding device is coupled to a connector device of a charging port provided in the vehicle, and power is supplied from the feeding device to the battery of the vehicle via the charging cable, whereby the battery is charged.

Patent Literature 1 proposes an electric vehicle charging connector in which a DC power receiving portion and an AC power receiving portion are collectively provided to form an integrated structure. In the electric vehicle charging connector, the DC power receiving portion and the AC power receiving portion, which are defined from each other, are arranged in a power receiving connector of a single structure, and a first cap for openably closing the entirety of the open end of the power receiving connector, and a second cap for openably closing a through hole formed through a portion of the first cap corresponding to the AC power receiving portion, are provided.

On the other hand, in the case of charging a battery of a vehicle by a feeding device, a communication function is required that allows transmission and reception of information for controlling the charge and information for managing the amount of charge, accounting, etc. between the vehicle and the feeding device.

Patent Literature 2 proposes a power system in which a plurality of electric vehicles and a supply management device perform power line communication with each other, and in which the plurality of electric vehicles each configured to be able to supply AC power can supply AC power to a common power consuming unit. In this power system, each of the plurality of vehicles having received a supply start instruction through power line communication transmits an identifier to other vehicles, one of the vehicles is determined as a master, and notification that the vehicle is the master is transmitted to other vehicles. The master vehicle generates an AC voltage in accordance with its own period, and other vehicles each generate an AC voltage synchronized with that of the master vehicle, whereby the plurality of vehicles start supplying power to a power load in a cooperative manner.

CITATION LIST

Patent Literature

[PTL 1] Japanese Laid-Open Patent Publication No. H7-192826
[PTL 2] Japanese Laid-Open Patent Publication No. 2008-035665

SUMMARY OF THE INVENTION

Problems to be Solved by the Invention

However, as in the power system described in Patent Literature 2, in order for a vehicle and an external device to perform power line communication, it is necessary to install on the vehicle a power line communication device (on-vehicle PLC (Power Line Communication) device) in which a component such as a coupling transformer for superimposing a signal on a power line and for extracting a signal superimposed on the power line is mounted on a circuit board. Since downsizing of a component such as a coupling transformer is restricted to some degree, (the circuit board for) the on-vehicle PLC device tends to be large. Since a large number of electronic apparatuses are installed in a vehicle such as an electric vehicle and thus space for arranging apparatuses in the vehicle is limited, downsizing of the on-vehicle PLC device is desired.

Therefore, an object of the present invention is to provide a power line communication system, a connector device, and a power line communication device that enable downsizing, in a vehicle having a function of performing power line communication with a feeding device via a charging cable, of a device for realizing the power line communication.

Solution to the Problems

A power line communication system according to the present invention is a power line communication system in which a vehicle and a feeding device are connected to each other with a charging cable, and a power line communication device installed in the vehicle and the feeding device perform power line communication with each other via the charging cable, the charging cable including two power supply wires, the power line communication device including: two internal power supply wires respectively connected to the two power supply wires included in the charging cable; and an electromagnetic induction type signal converter including a primary coil connected via a filter circuit to the two internal power supply wires and a secondary coil electromagnetically connected to the primary coil, the feeding device including: two internal power supply wires respectively connected to the power supply wires of the charging cable; and an electromagnetic induction type signal converter including a primary coil connected via a filter circuit to the two internal power supply wires and a secondary coil electromagnetically connected to the primary coil, wherein the two internal power supply wires and the filter circuit of the power line communication device, the two power supply wires of the charging cable, and the two internal power supply wires and the filter circuit of the feeding device are configured to form a current loop circuit, and the power line communication device and the feeding device are configured to superimpose a signal on the charging cable and to extract a signal superimposed on the charging cable, by means of the respective signal converters.

Further, the power line communication device of the power line communication system according to the present invention includes a connector device which is installed in the vehicle and to which the charging cable is connected, and the connector device is formed integrally with the signal converter.

Further, a connector device according to the present invention is a connector device including: a plurality of connection terminals; a connector body which houses the plurality of connection terminals; and a plurality of internal wires including two internal power supply wires and connected to the connection terminals, wherein the connector device is formed integrally with a signal converter connected to the two internal power supply wires.

Further, the connector device according to the present invention includes: a housing part which houses the plurality of connection terminals; and a tubular part which is provided to the housing part so as to project therefrom and through which the plurality of internal wires are inserted, and the signal converter includes: an annular magnetic body arranged externally around the tubular part; a first signal wire wound around the annular magnetic body and connected to and between the two internal power supply wires via a filter circuit; and a second signal wire wound around the annular magnetic body.

Further, the annular magnetic body of the connector device according to the present invention is configured to be externally fitted on the tubular part, and the tubular part is provided with cutouts for housing wound portions of the first signal wire and the second signal wire wound around the annular magnetic body.

Further, the filter circuit of the connector device according to the present invention includes: a capacitor connected to one end of the first signal wire and to one of the internal power supply wires; and a capacitor connected to the other end of the first signal wire and to the other of the internal power supply wires.

Further, a power line communication device according to the present invention includes the connector device; and a power line communication section which is connected to the second signal wire and which performs power line communication by means of an electromagnetic induction type signal converter formed by the annular magnetic body, the first signal wire, and the second signal wire of the connector device.

Further, a power line communication device according to the present invention is a power line communication device which performs power line communication with an external device via a charging cable which connected to the vehicle, the charging cable including two power supply wires, the power line communication device including: two internal power supply wires respectively connected to the power supply wires of the charging cable; an electromagnetic induction type signal converter including a primary coil connected via a filter circuit to the two internal power supply wires and a secondary coil electromagnetically connected to the primary coil, wherein superimposition of a signal on the charging cable and extraction of a signal superimposed on the charging cable are performed by means of the signal converter.

Further, the power line communication device according to the present invention includes: a connector device which is installed in the vehicle and to which the charging cable is connected, and the connector device is formed integrally with the signal converter.

In the present invention, the signal converter for power line communication is provided in the connector device to which the charging cable is connected, thereby realizing downsizing of the power line communication device (downsizing of the entire device for power line communication in the vehicle, including the connector device).

In the connector device, the housing part, which houses a plurality of connection terminals for providing connection with the charging cable, is provided with the tubular part through which a plurality of internal wires connected to the connection terminals are inserted, and the annular magnetic body serving as the core for the signal converter is arranged externally around the tubular part. The plurality of internal wires inserted through the tubular part include two internal power supply wires, and the first signal wire is connected via the filter circuit to and between the two internal power supply wires, and the first signal wire is wound around the annular magnetic body. Further, the second signal wire is wound around the annular magnetic body. The first signal wire wound around the annular magnetic body serves as the primary coil, and the second wire wound around the annular magnetic body serves as the secondary coil, thereby forming an electromagnetic induction type signal converter.

Accordingly, it is not necessary to provide a large signal converter in a circuit board and the like of the power line communication device, and thus, the power line communication device can be downsized. Furthermore, the power line communication device can be formed integrally with another device (such as body ECU (Electronic Control Unit)) in the vehicle, using a CPU (Central Processing Unit) in common.

Further, in the present invention, the tubular part of the connector device is provided with cutouts for housing the wound portions of the first signal wire and the second signal wire wound around the annular magnetic body. Accordingly, with the two signal wires wound around the annular magnetic body, the annular magnetic body can be externally fitted on the tubular part of the connector device, which facilitates assembly of the connector device.

Further, in the present invention, the filter circuit connected to the first signal wire is formed by using two capacitors. The capacitors are respectively connected to both ends of the first signal wire, and the capacitors at the both ends are respectively connected to the two internal power supply wires. That is, between the two internal power supply wires, a capacitor, the first signal wire wound around the annular magnetic body, and a capacitor are connected in series in this order. Accordingly, by using the signal converter formed by the annular magnetic body, the first signal wire, and the second signal wire, superimposition and extraction of a signal on and from the two internal power supply wires can be performed. Note that connection between a capacitor and the wire can be performed by a method such as crimping, using a sleeve, a metal-wire-like terminal of the capacitor and a portion of the wire in which the conductor is exposed with some of the insulation coating thereof removed.

Further, in the present invention, by connecting the charging cable including two power supply wires (two AC (Alternating Current) lines used in single-phase three-wire AC feeding (i.e., the two wires other than the grounding wire)), the power line communication device installed in the vehicle and an external feeding device perform power line communication with each other via the charging cable. Each of the power line communication device and the feeding device includes an electromagnetic induction type signal converter and a filter circuit provided between two internal power supply wires connected to the power supply wires of the charging cable. The signal converter can be configured by winding a signal wire provided between the two internal power supply wires around the core of the magnetic body so as to serve as the primary coil, and by winding a signal wire connected to a power line communication circuit or the like around the same core so as to serve as the secondary coil. Each of the power line communication device of the vehicle and the feeding device can superimpose a signal on the charging cable (one internal power supply wire and its corresponding power supply wire), by using its own signal converter, and can extract a signal superimpose thereon, thereby performing power line communication.

Further, in the present invention, by installing the electromagnetic induction type signal converter integrally with the connector device connected to the charging cable, wires and devices inside and outside the connector device can be electromagnetically separated from each other.

DESCRIPTION OF EMBODIMENTS

Figure 1:
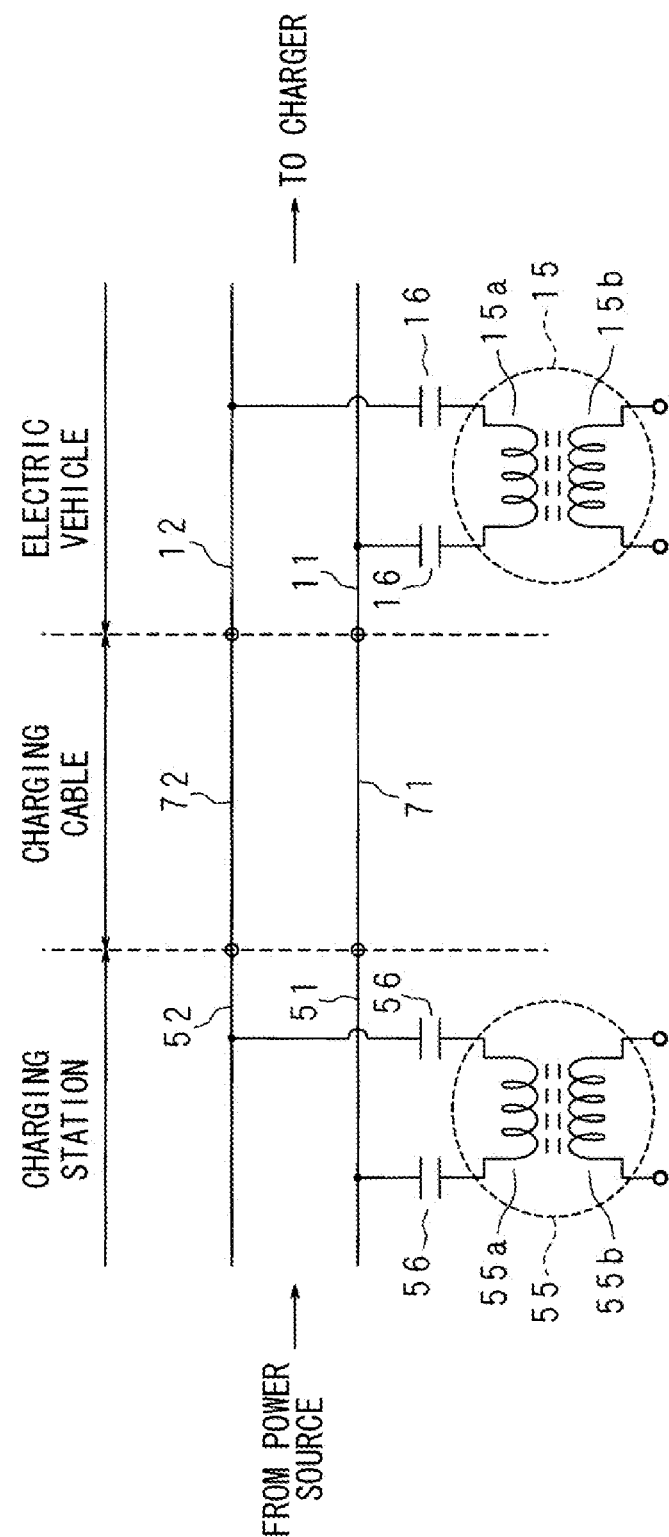
FIG. 1 is a schematic diagram for explaining a configuration of a power line communication system according to the present invention.

Hereinafter, the present invention will be described specifically, with reference to the drawings illustrating embodiments thereof. FIG. 1 is a schematic diagram for explaining a configuration of a power line communication system according to the present invention. In the present embodiment, description will be given of an example in which when a charging station is connected to an electric vehicle via a charging cable in order to charge a battery of the electric vehicle, information such as charge control, user authentication, or accounting management is transmitted and received between the charging station and the electric vehicle, through power line communication using the charging cable.

The charging cable which connects the electric vehicle and the charging station includes: two power supply wires (hereinafter, simply referred to as AC lines) 71 and 72 to which an AC voltage is applied; and a grounding wire (not shown in FIG. 1) connected to a ground potential. In the present embodiment, a three-wire AC voltage using the two AC lines and the one grounding wire is supplied from the charging station to the electric vehicle.

The charging station includes two internal power supply wires (hereinafter, simply referred to as AC lines) 51 and 52 which are connected to the AC lines 71 and 72 of the charging cable and to which an AC voltage is applied from a power source. In the charging station, a capacitor 56, a primary coil 55*a* of an electromagnetic induction type signal converter 55, and a capacitor 56 are connected in series in this order between the two AC lines 51 and 52. The two capacitors 56 connected to the AC lines 51 and 52 form a filter circuit. A secondary coil 55*b* of the electromagnetic induction type signal converter 55 is connected to a power line communication section (not shown) in the charging station.

Similarly, the electric vehicle includes two internal power supply wires (hereinafter, simply referred to a AC lines) 11 and 12 which are connected to the AC lines 71 and 72 of the charging cable and which guide the power from the charging station and the charging cable to a charger 4 (see FIG. 2) in the vehicle. Further, in the electric vehicle, a capacitor 16, a primary coil 15*a* of an electromagnetic induction type signal converter 15, and a capacitor 16 are connected in series in this order between the two AC lines 11 and 12. The two capacitors 16 connected to the AC lines 11 and 12 form a filter circuit. A secondary coil 15*b* of the electromagnetic induction type signal converter 15 is connected to a power line communication section 22 (see FIG. 2) in the electric vehicle.

By connecting the charging station and the electric vehicle to each other with the charging cable, two power supply paths are formed: a power supply path in which the AC line 51 of the charging station, the AC line 71 of the charging cable, and the AC line 11 of the electric vehicle are connected; and a power supply path in which the AC line 52 of the charging station, the AC line 72 of the charging cable, and the AC line 12 of the electric vehicle are connected. In a state where the charging station and the electric vehicle are connected to each other with the charging cable, a closed loop circuit is formed by the two power supply paths, the capacitors 16 and 56, and the electromagnetic induction type signal converters 15 and 55. Accordingly, by means of the electromagnetic induction type signal converters 15 and 55 arranged in this loop, it is possible to superimpose a signal on the power supply paths and to extract a signal superimposed thereon, and thus, the charging station and the electric vehicle can perform power line communication with each other.

Figure 2:
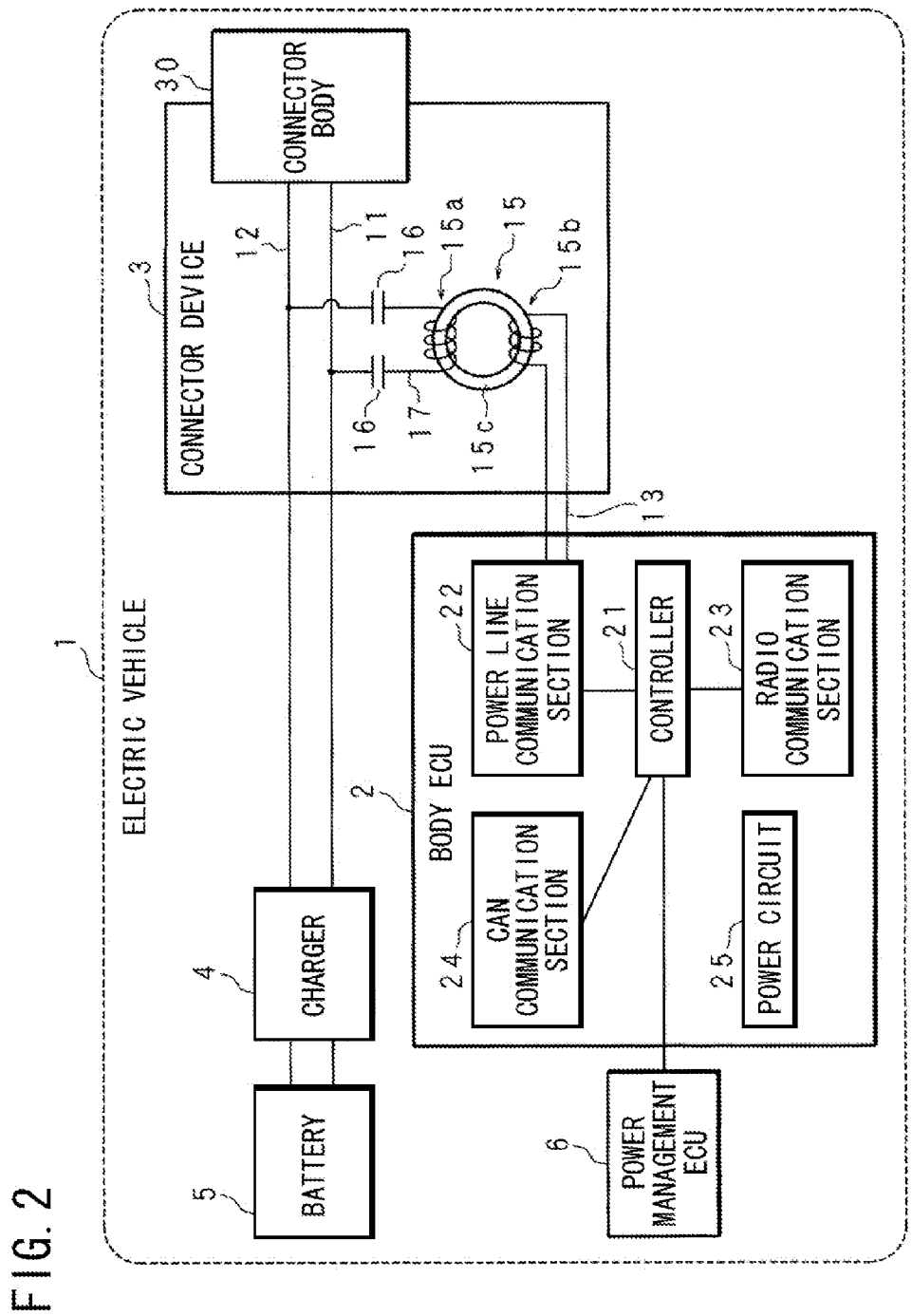
FIG. 2 is a block diagram showing an internal configuration of an electric vehicle corresponding to the power line communication system according to the present invention.

FIG. 2 is a block diagram showing an internal configuration of the electric vehicle corresponding to the power line communication system according to the present invention, and shows blocks relating to charging of and communication for the electric vehicle. In an electric vehicle 1 according to the present embodiment, a body ECU 2, a connector device 3, the charger 4, a battery 5, a power management ECU 6, and the like are installed. The body ECU 2 performs control for locking/unlocking doors, lighting headlights, and the like for the electric vehicle 1, and includes a controller 21, the power line communication section 22, a radio communication section 23, a CAN (Controller Area Network) communication section 24, a power circuit 25, and the like. In the electric vehicle 1 according to the present embodiment, the electromagnetic induction type signal converter 15 for power line communication is provided not in the power line communication section 22 or the body ECU 2 but in the connector device 3, in order to realize downsizing of (the body ECU 2 having) the power line communication section 22 and to enhance the degree of freedom for arrangement thereof in the electric vehicle 1.

Specifically, the controller 21 of the body ECU 2 is implemented by a processor such as a CPU (Central Processing Unit) or an MPU (Micro Processing Unit), and performs control of operations of sections in the body ECU 2, various types of arithmetic processing, and the like. In particular, in the present embodiment, the controller 21 is configured to be able to transmit and receive data to and from the power management ECU 6 of the electric vehicle 1. The controller 21 provides transmission data provided by the power management ECU 6, to the power line communication section 22, thereby performing data transmission through power line communication. The controller 21 also provides reception data that the power line communication section 22 received through power line communication, to the power management ECU 6.

The power line communication section 22 is connected via a signal wire 13 to the electromagnetic induction type signal converter 15 provided in the connector device 3 (note that the signal wire 13 forms the secondary coil 15b by being wound around a toroidal core 15c of the electromagnetic induction type signal converter 15, and is also a part of the electromagnetic induction type signal converter 15). The power line communication section 22 superimposes, on the AC lines 11 and 12, a signal corresponding to transmission data provided by the controller 21 by means of the electromagnetic induction type signal converter 15, thereby performing data transmission to the charging station via the charging cable. Further, the power line communication section 22 extracts a signal superimposed on the AC lines 11 and 12 by means of the electromagnetic induction type signal converter 15 to extract a signal from the charging station, and provides reception data corresponding to this signal to the controller 21.

The radio communication section 23 performs radio communication with communications apparatuses, such as a mobile phone of a user, inside or outside the vehicle. The CAN communication section 24 performs wired communication with other devices installed in the electric vehicle 1. Each of the radio communication section 23 and the CAN communication section 24 transmits data provided by the controller 21 and provides received data to the controller 21. The power circuit 25 supplies power supplied from the battery 5 of the electric vehicle 1 (or another battery) to sections in the body ECU 2, after performing adjustment of the voltage value, and the like.

The connector device 3 is a device for connecting the charging cable to the electric vehicle 1, and includes a connector body 30 provided with a plurality of connection terminals, the electromagnetic induction type signal converter 15 for power line communication, and two capacitors 16 forming a filter circuit. The AC lines 11 and 12 are connected to two connection terminals provided in the connector body 30. Each of the AC lines 11 and 12 is branched into two, one of the two being connected to the charger 4 and the other of the two being connected to a corresponding one of the two capacitors 16. Further, the two capacitors 16 are connected to each other via a signal wire 17. That is, a first capacitor 16, the signal wire 17, and a second capacitor 16 are connected in series in this order between the two AC lines 11 and 12.

The electromagnetic induction type signal converter 15 provided in the connector device 3 is formed by winding the signal wire 17 (at least one turn) provided between the AC lines 11 and 12 and winding the signal wire 13 connected to the power line communication section 22, around the toroidal core 15c which is an annular magnetic body. According to this configuration, the signal wire 17 wound around the toroidal core 15c serves as the primary coil 15a, and the signal wire 13 wound around the toroidal core 15c serves as the secondary coil 15b, thereby functioning as the electromagnetic induction type signal converter 15. Further, by integrally forming the electromagnetic induction type signal converter 15 in the connector device 3, a communication signal is prevented from flowing in the AC lines 11 and 12 in the electric vehicle 1, and thus, the other apparatuses in the electric vehicle 1 are less likely to be affected by electromagnetic waves emitted from the communication signal. Further, the communication signal is less likely to be affected by electromagnetic waves emitted by the other apparatuses in the electric vehicle 1. In this manner, mutual adverse effects can be reduced. A detailed configuration of the connector device 3 will be described later.

The charger 4 charges the battery 5 with the power supplied by the charging station. The charging station supplies power using an AC voltage, for example, whose voltage value is 200 V and whose frequency is 50 Hz or 60 Hz. Therefore, the charger 4 performs the charge by converting the AC voltage into a DC voltage and applying the DC voltage to the battery 5. The battery 5 accumulates power for driving a motor (not shown) that causes the electric vehicle to travel. The battery 5 is a lithium-ion battery, for example. The power management ECU 6 performs control relating to charging of the electric vehicle. The power management ECU 6 performs charge control, by obtaining information from the charging station (such as the voltage value, frequency, or accounting information of the supplied power) through power line communication via the power line communication section 22 in the body ECU 2, and by controlling operations of the charger 4 and the like based on the obtained information.

Figure 3:
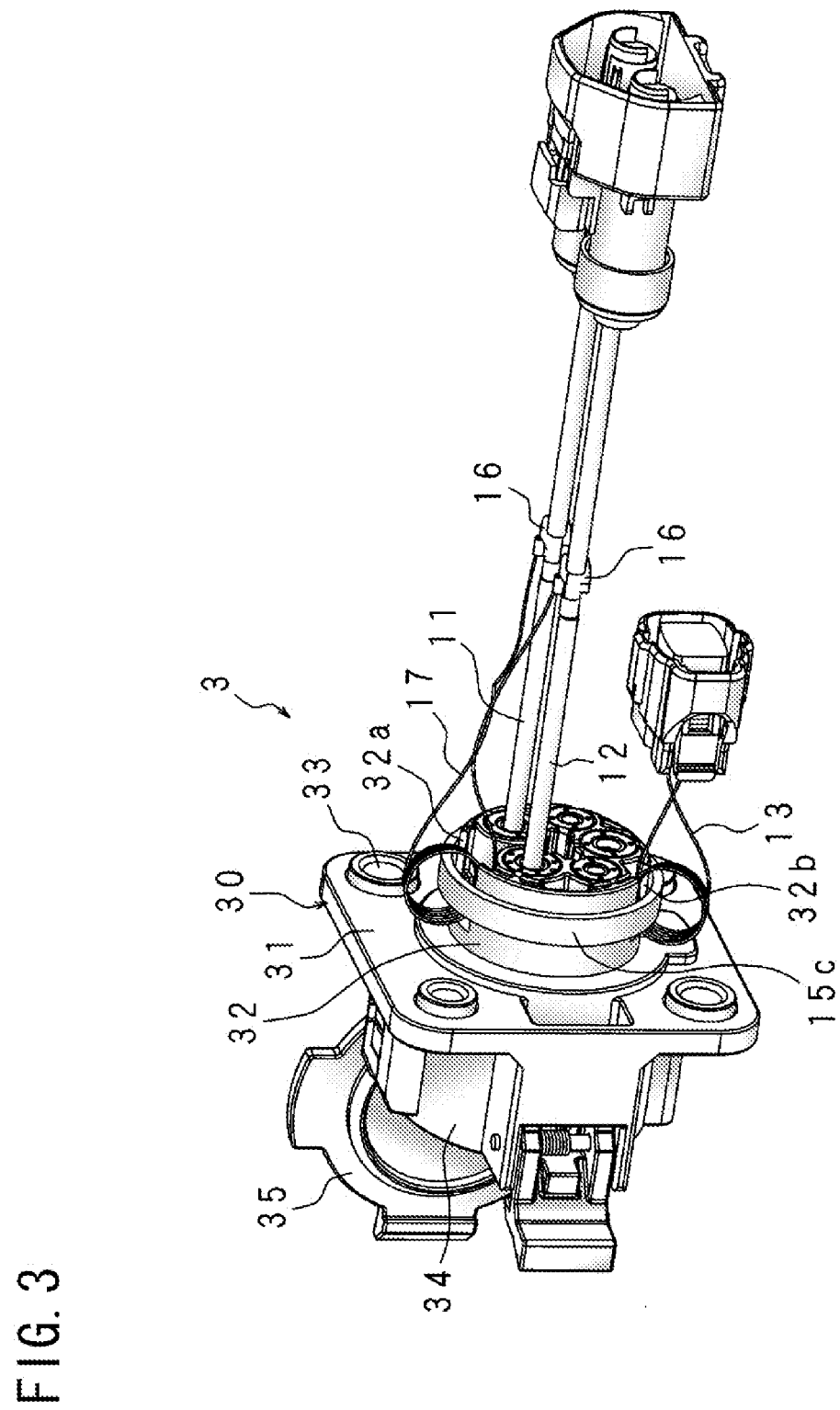
FIG. 3 is an external perspective view showing a configuration of a connector device.
Figure 4:
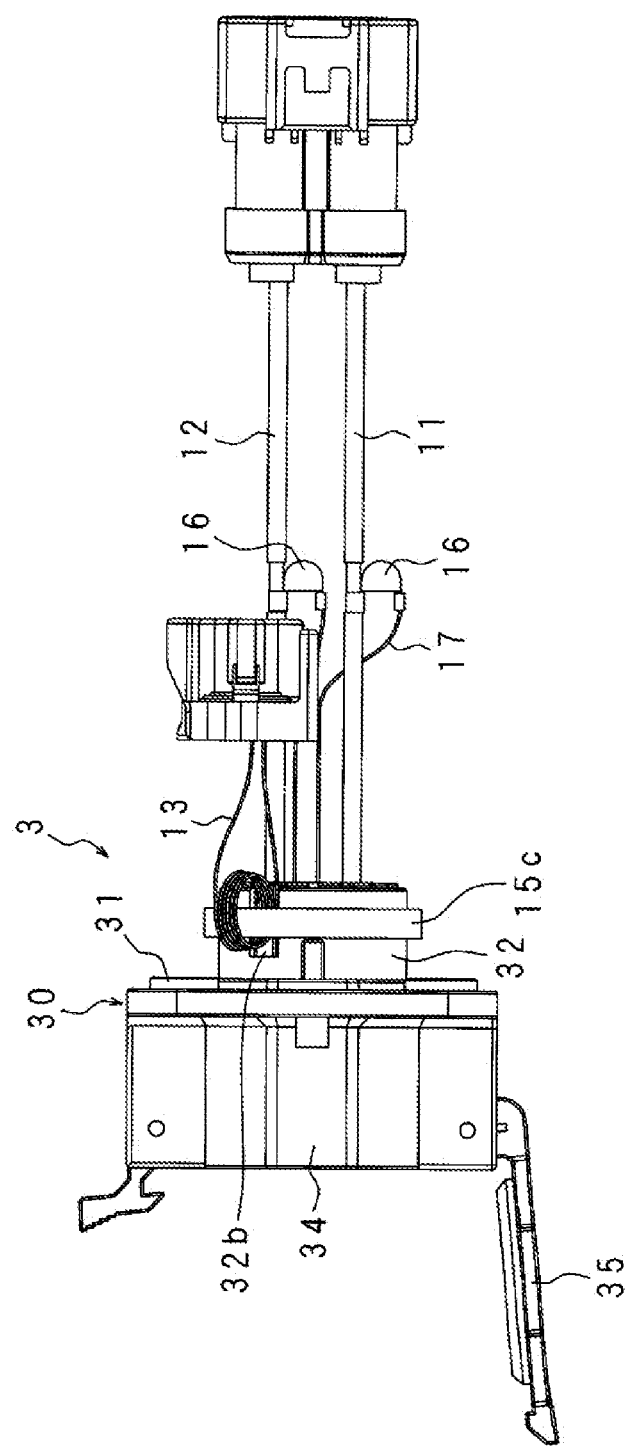
FIG. 4 is a side view showing a configuration of the connector device.
Figure 5:
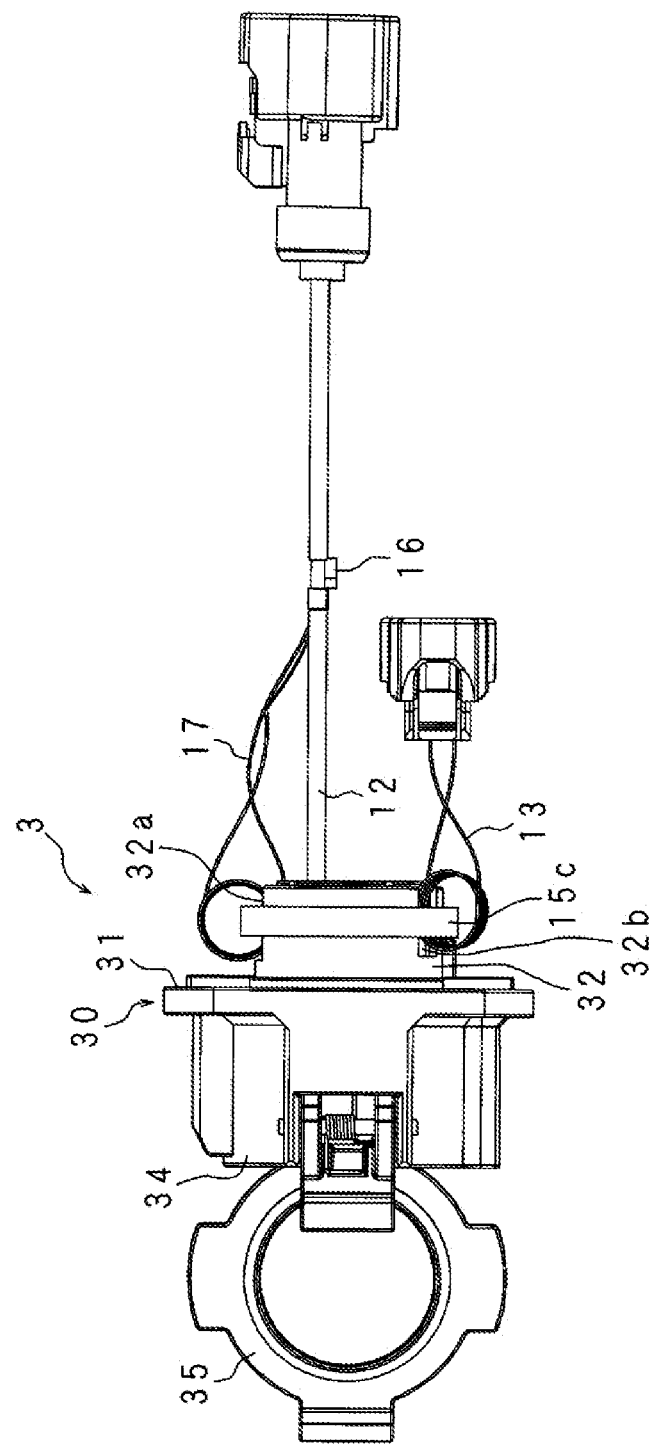
FIG. 5 is a side view showing a configuration of the connector device.
Figure 6:
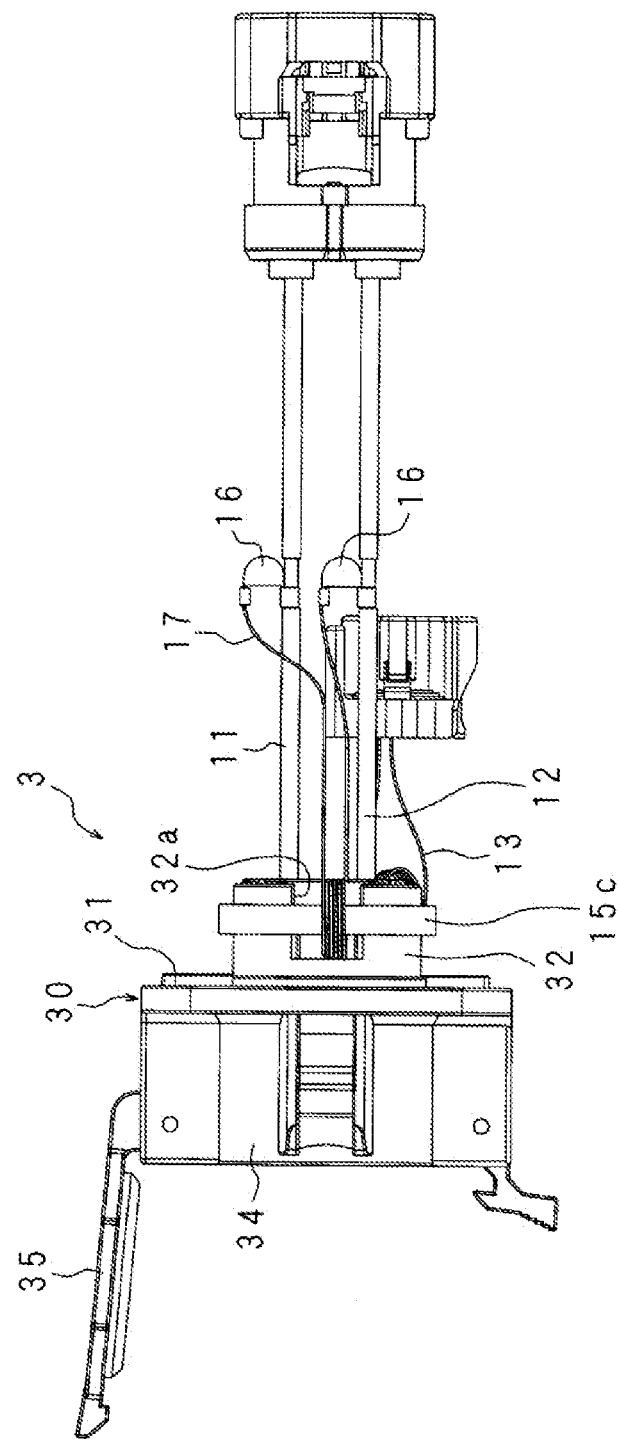
FIG. 6 is a side view showing a configuration of the connector device.
Figure 7:
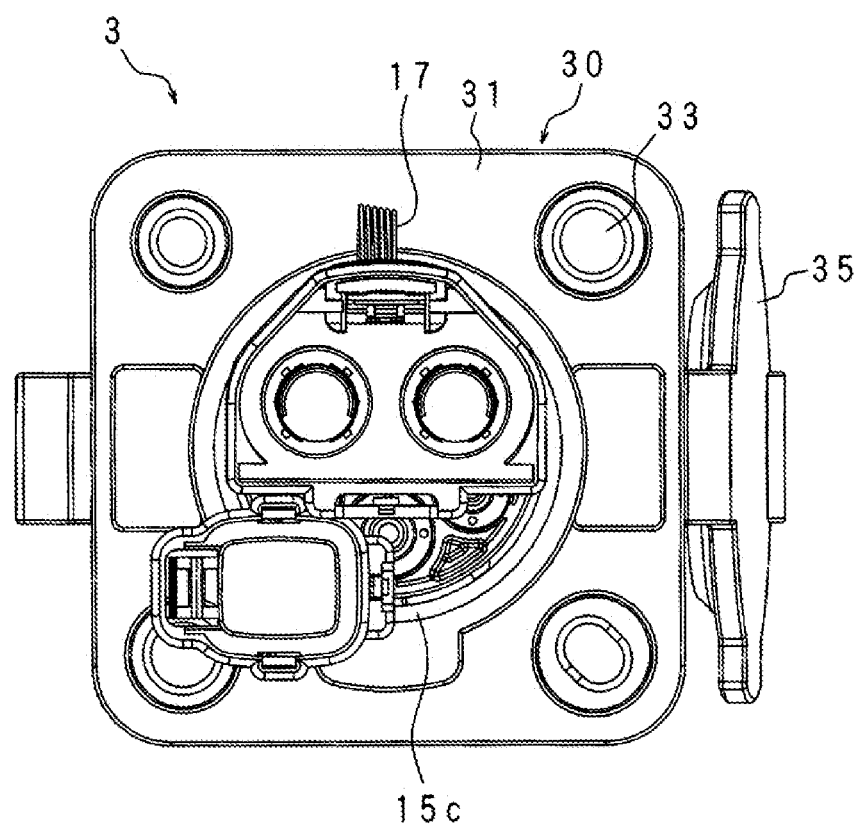
FIG. 7 is a plan view showing a configuration of the connector device.

FIG. 3 is an external perspective view showing a configuration of the connector device 3, and shows an external view of a portion of the connector device 3 that should be positioned inside the electric vehicle 1 when it is installed in the electric vehicle 1. Each of FIG. 4 to FIG. 6 is a side view showing the configuration of the connector device 3. FIG. 4 shows the connector device 3 viewed from below in FIG. 3, FIG. 5 shows the connector device 3 viewed from the front side in FIG. 3, and FIG. 6 shows the connector device 3 viewed from above in FIG. 3. FIG. 7 is a plan view showing the configuration of the connector device 3. Note that in FIG. 3 to FIG. 7, internal wires other than the AC lines 11 and 12 and the signal wires 13 and 17 (such as the internal wire for the ground potential) are not shown.

The connector device 3 includes the connector body 30 which houses a plurality of connection terminals (not shown) to which the two AC lines 11 and 12, one grounding wire 14, and the like are connected. The connector body 30 includes an attachment part 31 having a substantially-rectangular and plate like shape, and a cylindrical tubular part 32 provided at the center of a face of the attachment part 31 so as to project therefrom. A mounting hole 33 is formed at each of four corners of the attachment part 31, and the connector body 30 can be mounted at a predetermined position of the body of the electric vehicle 1 by means of screws or the like. Note that the connector body 30 is mounted such that the side on which the tubular part 32 is provided is arranged inside the body.

A cable connection part 34, which has a cylindrical shape and to which a charging cable is connected by being inserted therein at the time of charging, is provided on the other face of the attachment part 31 of the connector body 30. The cable connection part 34 houses therein a plurality of connection terminals connected to internal wires such as the AC lines 11 and 12 and the grounding wire, and provides electrical connection to the charging cable. Further, in the cable connection part 34, a cover 35 is openably provided so as to close the opening portion of the cable connection part 34, in order to prevent the connection terminals from being exposed when the charging cable is not connected thereto.

The two AC lines 11 and 12 connected to two connection terminals housed in the cable connection part 34 are provided in such a manner as to pass through the attachment part 31 of the connector body 30 to be inserted through the tubular part 32. The AC lines 11 and 12, which are inserted through the tubular part 32 and arranged inside the electric vehicle 1, are arranged as appropriate in the electric vehicle 1, to be connected to the charger 4. At appropriate positions between an end of the tubular part 32 and the charger 4, the capacitors 16 are connected to the AC lines 11 and 12, respectively. Each capacitor 16 is an electrical component having two metal-wire-like terminals, for example. One of the two terminals is connected to a portion of the AC line 11 or 12 in which the internal metal conductor is exposed with some of the insulation coating thereof removed. To the other terminal of the capacitor 16, the signal wire 17 is connected. Connection between a terminal of the capacitor 16 and the AC line 11 or 12, and connection between the other terminal of the capacitor 16 and the signal wire 17 can be performed by a method such as crimping that uses an annular sleeve, for example.

The signal wire 17 is wound around the toroidal core 15*c*, and then both ends of the signal wire 17 are respectively connected to terminals of the capacitors 16. By winding the signal wire 17 around the toroidal core 15*c*, the wound portion of the signal wire 17 and the toroidal core 15*c* can function as the primary coil 15*a*. Further, the signal wire 13, which is connected to the power line communication section 22 of the body ECU 2, is wound around the toroidal core 15*c*. By winding the signal wire 13 around the toroidal core 15*c*, the wound portion of the signal wire 13 and the toroidal core 15*c* can function as the secondary coil 15*b*.

The toroidal core 15*c* for forming the electromagnetic induction type signal converter 15 is configured to be externally fitted on the tubular part 32 of the connector body 30. After the signal wires 17 and 13 are wound around the toroidal core 15*c*, the toroidal core 15*c* is fitted on the tubular part 32, whereby the connector device 3 is assembled. The tubular part 32 is provided with two cutouts 32*a* and 32*b* for respectively housing the signal wires 17 and 13 wound around the toroidal core 15*c*, when the toroidal core 15*c* is fitted on the tubular part 32. Each of the cutouts 32*a* and 32*b* is cut out along the axis direction of the tubular part 32 to reach the edge of the tubular part 32, into a substantially rectangular shape.

According to the power line communication system having the above configuration, the electromagnetic induction type signal converter 15 necessary for power line communication is provided in the connector device 3, and the power line communication section 22, which performs processing relating to power line communication by inputting and outputting a signal to and from the electromagnetic induction type signal converter 15, is provided in the body ECU 2. Accordingly, it is possible to save space for arranging the power line communication device in the electric vehicle 1. The electromagnetic induction type signal converter 15 is configured such that the signal wires 17 and 13 are wound around the annular toroidal core 15*c* which is to be fitted on the tubular part 32 of the connector device 3. Accordingly, the electromagnetic induction type signal converter 15 can be provided in the connector device 3 while suppressing, to as great extent as possible, the device from becoming large, compared with a conventional connector device without the electromagnetic induction type signal converter 15. Moreover, since the large toroidal core 15*c* can be provided in the connector device 3, it is possible to improve communication accuracy of power line communication using the electromagnetic induction type signal converter 15 having the toroidal core 15*c*.

Further, since the cutouts 32*a* and 32*b* for housing the signal wires 17 and 13 wound around the toroidal core 15*c* are formed in the tubular part 32 of the connector device 3, the toroidal core 15*c* around which the signal wires 17 and 13 are wound can be easily fitted on the tubular part 32. Accordingly, assembly of the connector device 3 can be facilitated.

In the present embodiment, the power line communication section 22, which performs signal processing for the power line communication device, is provided in the body ECU 2. However, the present invention is not limited thereto. A power line communication device which is different from the body ECU 2 may be installed in the electric vehicle 1, and the power line communication section 22 may be provided in this power line communication device. Even in this case, the coupling transformer need not be installed on the circuit board of the power line communication device, and thus, the power line communication device can be downsized. Further, the power line communication section 22, which performs signal processing for the power line communication device, may be integrated into an ECU having a CPU other than the body ECU 2.

Although the electric vehicle 1 has been described as an example of a vehicle provided with a power line communication function, the present invention is not limited thereto. Such a vehicle may be another vehicle having a function of charging a battery from outside, such as a plug-in hybrid vehicle. Further, although a charging station has been described as an example of a feeding device provided with a power line communication function, the present invention is not limited thereto. Such a feeding device may be another device having a function of feeding a vehicle via a charging cable. For example, in a case where a user plugs a charging cable into an outlet in the user's house and charges a vehicle, a power line communication device may be provided on a switchboard or the like of the house. Furthermore, a circuit that performs power line communication may be installed in a charging cable.

In the configuration of the connector device 3 shown in FIG. 3 to FIG. 6, the connection positions of the capacitors 16 to the AC lines 11 and 12 are not limited to those shown, and the capacitors 16 may be connected at any positions between the tubular part 32 and the charger 4. However, the capacitors 16 are preferably connected near the tubular part 32. Further, the capacitors 16 are connected to the AC line 11 and 12 and the signal wire 17, using sleeves. However, the present invention is not limited thereto. For example, the capacitors 16 may be connected by another method, such as soldering.

As described above, according to the present embodiment, a signal converter for power line communication is provided in a connector device to which a charging cable is connected. For example, by inserting two internal power supply wires through a tubular part provided in the connector, connecting a first signal wire to the two internal power supply wires via a filter circuit, winding the first signal wire around an annular magnetic body provided externally around the tubular part, and winding around the annular magnetic body a second signal wire connected to a power line communication section or the like, an electromagnetic induction type signal converter is formed by the annular magnetic body, the first signal wire, and the second signal wire. Therefore, it is not necessary to provide a signal converter on a circuit board or the like of the power line communication device, and thus, downsizing of the power line communication device can be realized.

Further, by integrally installing the electromagnetic induction type signal converter in the connector device to which the charging cable is connected, a communication signal is prevented from flowing in the AC lines in the vehicle. Accordingly, the communication signal relating to power line communication is less likely to be affected by noise emitted from other apparatuses in the vehicle, and in addition, other apparatuses in the vehicle are less likely to be affected by noise due to the communication signal.

Further, by the connector device insulating an AC voltage of 100 V/230 V, for example, communication lines arranged in the vehicle receives low voltage of several volts and a low current, and thus, the communication lines can be made thin.

In addition, since commercial power is not inputted in the power line communication device, it is not necessary to secure insulation distances, and thus, it is possible to save space.

DESCRIPTION OF THE REFERENCE CHARACTERS 1 electric vehicle
2 body ECU
3 connector device
4 charger
11 AC line (internal power supply wire)
12 AC line (internal power supply wire)
15 electromagnetic induction signal converter
15a primary coil
15b secondary coil
15c toroidal core
16 capacitor (filter)
21 controller
22 power line communication section
30 connector body (housing part)
31 attachment part
32 tubular part
33 mounting hole
51 AC line
52 AC line
55 electromagnetic induction type signal converter
55a primary coil
55b secondary coil
56 capacitor
71 AC line
72 AC line

The invention claimed is:

1. A power line communication system in which a vehicle and a feeding device are connected to each other with two power supply lines, and a power line communication device installed in the vehicle and the feeding device perform power line communication with each other via the two power supply lines,
the power line communication device comprising:
a plurality of connection terminals connected to the two power supply lines;
a housing part which houses the plurality of connection terminals;
first two internal power supply wires connected to the plurality of connection terminals;
a tubular part which is provided to the housing part so as to project therefrom and through which the first two internal power supply wires are inserted; and
a first electromagnetic induction type signal converter comprising a primary coil connected via a first filter circuit to the first two internal power supply wires and a secondary coil electromagnetically connected to the primary coil, the first electromagnetic induction type signal converter including an annular magnetic body arranged externally around the tubular part, a first signal wire wound around the annular magnetic body and connected to and between the first two internal power supply wires via the first filter circuit and a second signal wire wound around the annular magnetic body,
the feeding device comprising:
second two internal power supply wires respectively connected to the two power supply lines; and
a second electromagnetic induction type signal converter comprising a primary coil connected via a second filter circuit to the second two internal power supply wires and a secondary coil electromagnetically connected to the primary coil, wherein
the first two internal power supply wires and the first filter circuit of the power line communication device, the two power supply lines, and the second two internal power supply wires and the second filter circuit of the feeding device are configured to form a current loop circuit, and
the power line communication device and the feeding device are configured to superimpose a signal on the two power supply lines and to extract a signal superimposed on the two power supply lines, by means of the respective electromagnetic induction type signal converters.

2. The power line communication system according to claim 1, wherein
the power line communication device includes a connector device which is installed in the vehicle and to which the two power supply lines are connected, and
the connector device is formed integrally with the first electromagnetic induction type signal converter of the power line communication device.

3. A connector device comprising:
a plurality of connection terminals;
a housing part which houses the plurality of connection terminals; and
two internal power supply wires connected to the connection terminals;
a tubular part which is provided to the housing part so as to project therefrom and through which the two internal power supply wires are inserted; and
a signal converter connected to the two internal power supply wires and including an annular magnetic body arranged externally around the tubular part, a first signal wire wound around the annular magnetic body and connected to and between the two internal power supply wires via a filter circuit, and a second signal wire wound around the annular magnetic body.

4. The connector device according to claim 3, wherein the annular magnetic body is configured to be externally fitted on the tubular part, and
the tubular part is provided with cutouts for housing wound portions of the first signal wire and the second signal wire wound around the annular magnetic body.

5. The connector device according to claim 3, wherein the filter circuit includes:
  a capacitor connected to one end of the first signal wire and to one of the internal power supply wires; and
  another capacitor connected to the other end of the first signal wire and to the other of the internal power supply wires.

6. A power line communication device comprising:
the connector device according to claim 3; and
a power line communication section which is connected to the second signal wire and which performs power line communication by means of an electromagnetic induction type signal converter formed by the annular magnetic body, the first signal wire, and the second signal wire of the connector device.

7. A power line communication device which performs power line communication with an external device via two power supply lines which are connected to a vehicle, the power line communication device comprising:
  a plurality of connection terminals connected to the two power supply lines;
  a housing art which houses the plurality of connection terminals;
  two internal power supply wires connected to the plurality of connection terminals;
  a tubular part art which is provided to the housing part so as to project therefrom and through which the two internal power supply wires are inserted;
  an electromagnetic induction type signal converter comprising a primary coil connected via a filter circuit to the two internal power supply wires and a secondary coil electromagnetically connected to the primary coil, the electromagnetic induction type signal converter including an annular magnetic body arranged externally around the tubular part, a first signal wire wound around the annular magnetic body and connected to and between the two internal power supply wires via the filter circuit and a second signal wire wound around the annular magnetic body, wherein
  superimposition of a signal on the two power supply lines and extraction of a signal superimposed on the two power supply lines are performed by means of the electromagnetic induction type signal converter.

8. The power line communication device according to claim 7, comprising:
  a connector device which is installed in the vehicle and to which the two power supply lines are connected, wherein
  the connector device is formed integrally with the electromagnetic induction type signal converter.

* * * * *